May 29, 1928.
C. D. MEEKER
1,671,736
SUPPORT FOR TABLE TOPS
Filed Nov. 14, 1925
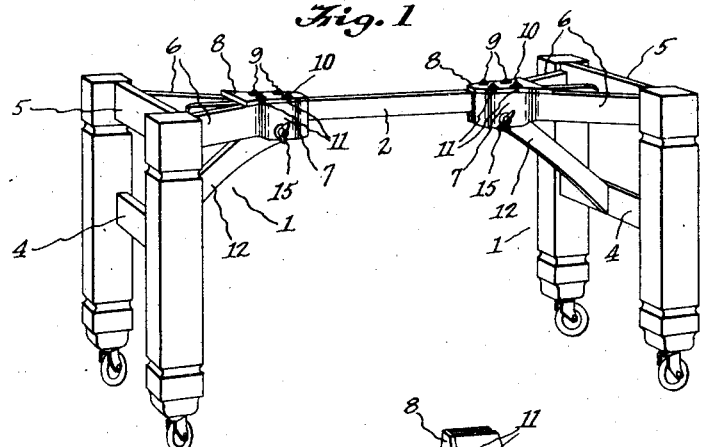
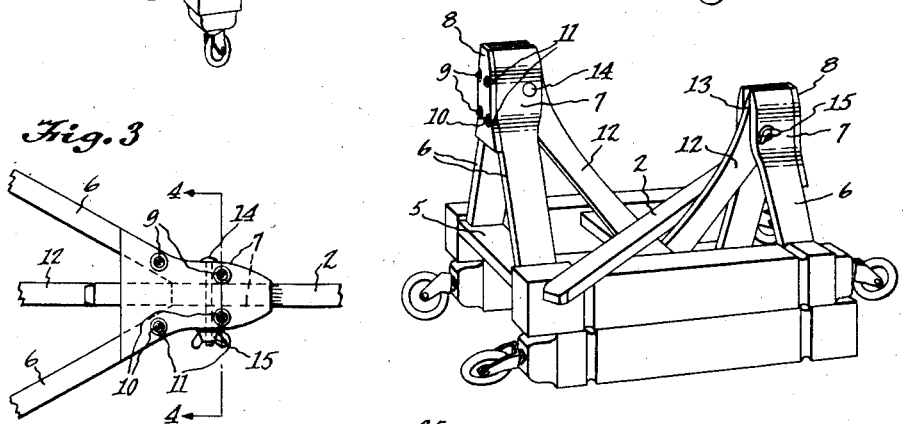
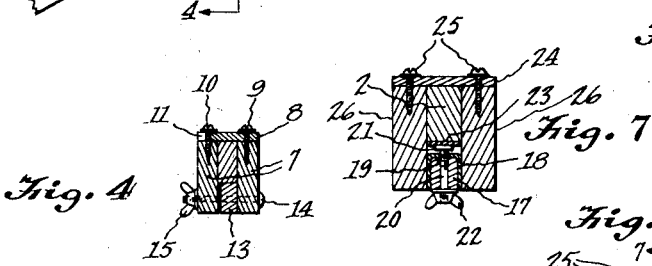
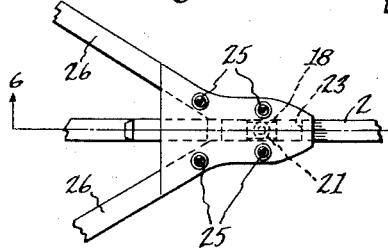
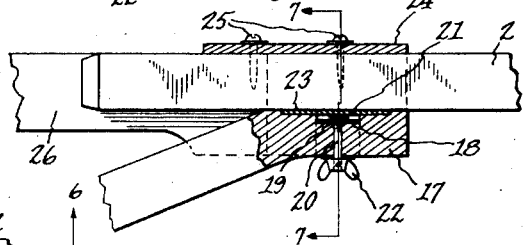
INVENTOR
Channing D. Meeker
BY John A. Bomhardt
ATT'Y Patented May 29, 1928.

1,671,736

UNITED STATES PATENT OFFICE.

CHANNING D. MEEKER, OF BEDFORD, OHIO.

SUPPORT FOR TABLE TOPS.

Application filed November 14, 1925. Serial No. 69,180.

This invention relates to supports for table tops, caskets, show cases, and the like and has for its object to provide a pair of leg units adapted to be joined together by a connecting bar.

Another object of the invention is to provide a support for table tops and the like which is capable of being readily disassembled and packed in a small space for shipment.

A further object of the invention is to provide such a support which will be capable of adjustment for use in various caskets or the like of different sizes.

The invention is illustrated in the accompanying drawings, in which—

Figure 1 is a perspective view of the support assembled for use;

Figure 2 is a perspective view of the support disassembled and arranged for shipping or storage;

Figure 3 is a detail plan view showing the clamping member;

Figure 4 is a section on line 4—4 of Figure 3;

Figure 5 is a plan view of a modification of the clamping member;

Figure 6 is a section on line 6—6 of Figure 5; and

Figure 7 is a section on line 7—7 of Figure 6.

Referring specifically to the drawings, 1 indicates generally a leg unit which is adapted to be joined to another like leg unit by a connecting bar 2. Each leg unit comprises two legs joined by lower cross bar 4 and upper cross bar 5. Secured to the upper cross bar are two converging arms 6 terminating in parallel ends 7. A plate 8 is secured to the ends 7 by screws 9 and 10, and serves to hold ends 7 together. Slots 11 are provided in plate 8 to permit clamping movement of the ends 7 upon connecting bar 2. An angle brace 12 is secured to lower cross bar 4 and terminates in an end 13 which is positioned between ends 7 and is secured by bolt 14 and wing nut 15.

Connecting bar 2 is slidably supported on brace end 13 between clamp ends 7 and cover plate 8. The clamp ends frictionally engage bar 2, locking and holding the latter rigid when wing nut 15 is turned on bolt 14 and screws 10 are tightened as shown in Figure 4.

A modified form of clamping means is shown in Figures 5 and 6 and 7 in which angle brace end 17 is provided with an inserted inverted U-shaped member 18 which is threaded as at 19 to receive bolt 20 formed with a flat head 21 and a pinned wing nut 22. Set into the top of end 17 is a clamping plate 23 disposed above bolt 20 and lying under connecting bar 2. Upon turning up bolt 20, head 21 will push clamping plate 23 against connecting bar 2, frictionally locking the same against plate 24 which is secured by screws 25 to brace member 26.

It will be seen that the clamping means provided allow adjustment of the leg units toward and away from each other, thus permitting arrangement for the support of caskets and the like of various sizes.

The invention provides a new support which can be cheaply manufactured, having parts which will withstand the most severe use.

I claim:—

1. A support of the type described having two leg units connected together by a connecting bar, each unit comprising two legs connected together by an upper and a lower cross bar, two arms projecting from the upper cross bar, a plate connecting the ends of said arms, a brace projecting from the lower cross bar and secured to said arms near the ends thereof, and a clamp to adjustably hold one end of the connecting bar in the space formed by the ends of the arms, the brace, and the plate.

2. In a support comprising two leg units separably connected by a connecting bar, each of said units consisting of two legs connected together by cross bars, clamping means comprising two arms secured thereto and projecting therefrom, a plate loosely secured to said arms near the ends thereof to hold the same in spaced adjustable relation, a brace projecting from one of the cross bars to a position between the ends of said arms, and a bolt extending through the arms and the brace.

3. A knockdown support for a table top or the like, comprising two leg units, each leg unit consisting of two legs, upper and lower cross bars connecting the legs, inwardly projecting converging arms near the tops of the legs, a brace projecting from the lower cross bar, a detachable connecting bar between the two units, and a clamping device at each end of the connecting bar, each of said clamping devices engaging and holding the adjacent ends of the arms, the brace, and the connecting bar, whereby said arms, brace, and connecting bar are fastened together at their meeting ends.

4. A support device having a pair of leg units, each of said units having two legs and two cross bars between the legs, a connector bar slidable in each of said leg units and confined longitudinally by one of said cross bars of each of the leg units, a brace extending from the other of said cross bars of each of the leg units and abutting said connector bar, and means for clamping said leg units to said connector bar.

5. A support device having a connector bar, a pair of leg units, each of said units having a pair of spaced resilient arms adjacent to the two sides of said connector bar, a brace on each of said leg units and extending into the space between said arms and adjacent to one edge of said connector bar, and clamp means acting on said arms to clamp the same against said two sides of the connector bar.

6. A support device having a pair of leg units, each of said units having a pair of arms spaced to form two guide walls, a brace on each of said leg units and extending into the space between said arms to form another guide wall, a plate across said arms to form another guide wall, a connector bar extending between said leg units and guided by said walls, and means for clamping some of said walls against said connector bar.

In testimony whereof, I affix my signature.

CHANNING D. MEEKER.